United States Patent [19]  [11] 3,907,727
Lipp  [45] Sept. 23, 1975

[54] PROCESS FOR DISPERSING CARBON BLACK IN ACRYLATE PLASTICS

[75] Inventor: Hayden Ivan Lipp, Parkersburg, W. Va.

[73] Assignee: E. I. Du Pont de Nemours and Company, Wilmington, Del.

[22] Filed: Nov. 25, 1974

[21] Appl. No.: 527,065

[52] U.S. Cl.......... 260/17 R; 260/42.52; 260/42.56; 260/42.57
[51] Int. Cl.² ..... C08J 3/22; C08K 3/04; C08L 1/18
[58] Field of Search .... 260/17, 42.52, 42.56, 42.57, 260/89 A, 89 S

[56] References Cited
UNITED STATES PATENTS

| | | | |
|---|---|---|---|
| 2,101,061 | 12/1937 | Gordon | 260/89.5 A |
| 2,907,722 | 10/1959 | Staigopoulos | 260/17 |
| 2,989,492 | 6/1961 | Sanderson | 260/17 |
| 3,399,152 | 8/1968 | Jamrog et al. | 260/17 |
| 3,442,851 | 5/1969 | McManimie | 260/41 |
| 3,462,390 | 8/1969 | Dunn | 260/41 |
| 3,503,922 | 3/1970 | Carton | 260/41 |
| 3,821,138 | 6/1974 | Petke | 260/42.52 |

OTHER PUBLICATIONS

Chem. Absts., 69:(1968), 78537z, "Acrylic-Carbon Black-," Hardy.
Chem. Absts., 73:(1970), 121237y, "Carbon Black, Adducted Polymers and Pigments," Yamashita et al.

*Primary Examiner*—Melvin Goldstein
*Assistant Examiner*—Edward Woodberry

[57] ABSTRACT

A process for preparing acrylate sheets tinted with furnace carbon black is provided wherein said process comprises mixing a concentrate of said furnace carbon black in a compatible polymer vehicle with methyl methacrylate or methyl methacrylate sirup and nitrocellulose to provide a dispersion of said ingredients which can be cast on a substrate directly or further diluted with acrylate sirup, followed by curing the cast dispersion to provide a sheet thereof that is optically transparent and substantially free of haze.

10 Claims, No Drawings

PROCESS FOR DISPERSING CARBON BLACK IN ACRYLATE PLASTICS

FIELD OF THE INVENTION

The present invention relates to a process for preparing sheet structures of polymeric material and, more particularly, is directed to a novel process for preparing tinted sheeting of acrylate polymeric material.

BACKGROUND OF THE INVENTION

Tinted Acrylate sheet structures, ordinarily referred to as cast acrylate sheet, containing small amounts of channel carbon black of small particle size well dispersed therein are known articles of manufacture useful as tinted glazing material having reduced transmission of both visible light and solar energy, as well as reduced glare properties. Such cast acrylate sheet also possesses improved impact strength relative to glass and is useful for making articles such as sun glasses and canopies for aircraft structures where a high degree of transparency is required in the tinted article. Heretofore, the tinted cast acrylate sheet has been made by adding a tinting concentrate to the acrylate sirup from which the sheet is cast. Specifically, the tinting concentrate utilized consists of channel carbon black (made by the channel or impingement process) of selected particle size that has been hot-roll milled with nitrocellulose and an inert plasticizer. The concentrate of channel carbon black and nitrocellulose may be added directly to the acrylate polymer or acrylate sirup and mixed therewith in conventional low-shear agitators to provide the casting dispersion from which the tinted cast acrylate sheet is made. Alternatively, the concentrate of channel carbon black and nitrocellulose may be added and dispersed by low-shear agitation means into methyl methacrylate or acrylate sirup to form a color masterbatch which may then be let-down by mixing with additional methyl methacrylate or acrylate sirup, as the case may be, to provide a casting sirup having the desired content of channel carbon black from which the tinted cast acrylate sheet is made.

The future availability of channel carbon black is, however, altogether uncertain because the methods and processes for its manufacture are undesirable from an environmental standpoint. Furnace carbon black (i.e., carbon black prepared by the furnace process), on the other hand, does not suffer the environmental hazard drawback of channel carbon black. However, unlike channel carbon black, furnace carbon black cannot be dispersed sufficiently well in nitrocellulose by hot-roll milling to form tinting concentrates suitable for high quality acrylate cast sheets. Accordingly, the principal object of the present invention is to provide a process for preparing tinting concentrates of furnace carbon black which may, in turn, be utilized for making tinted cast acrylate sheet.

THE INVENTION

According to the present invention there is provided a process for preparing a tinted article of acrylate polymeric material comprising (a) mixing a dispersion of (1) not more than 50% by weight, based upon the total weight of said dispersion, of a concentrate of not more than 20% by weight, based upon the total weight of said concentrate, of furnace carbon black and, complementally, not less than 80% by weight, based upon the total weight of said concentrate, of an acrylate polymer, (2) not less than 50% by weight, based upon the total weight of said dispersion, of methyl methacrylate or methyl methacrylate sirup, and (3) at least 0.01% by weight, based upon the total weight of said dispersion, of nitrocellulose; (b) adding a polymerization catalyst to said dispersion and casting said dispersion on a substrate followed by heating said dispersion to a temperature of at least 50°C. to cure said dispersion and thereby provide said article of acrylate polymeric material.

DETAILED DESCRIPTION OF THE INVENTION

The process of the present invention entails, in broad terms, preparing a tinting concentrate of furnace carbon black and thereafter adding and mixing the tinting concentrate in an acrylate monomer system to provide a dispersion which is converted into shaped articles such as, for example, tinted sheet by casing the dispersion onto a substrate and heating the cast dispersion to polymerize the acrylate monomer thereof.

The tinting concentrate of furnace carbon black is prepared by mixing the furnace carbon black in high viscosity acrylate polymer accompanied by high shear. This may be conveniently done by feeding a blend of the furnace carbon black and an acrylate resin such as a polymer of methyl methacrylate or a copolymer of methyl methacrylate and ethyl acrylate into a high shear, twin-screw, self-wiping extruder such as, for example, a model ZSK-53, 53 mm. twin-screw Werner-Pfleiderer extruder (Werner-Pfleiderer Corp., Stuttgart, West Germany). The concentration of furnace carbon black in the concentrate may vary from 0.01% to about 20% by weight, based upon the total weight of the concentrate; the concentration of furnace carbon black is preferably between about 1% and about 10% by weight. The concentration of acrylate polymer in the blend and in the resulting concentrate is greater than (i.e., not less than) 80% by weight, based upon the total weight of the concentrate. In practice, the temperature profile of the extruder device is maintained in a range of from ambient temperature at the feed zone to about 240°C. at the extruding die. For instance, the blend of furnace carbon black and high viscosity acrylate polymer is fed into the feed zone of the extruder at ambient temperature; the first intermediate zone after the feed zone may be heated to 150°C. and subsequent intermediate zones may be heated to 230°C., and the extruding zone may be heated to 240°C. Suitable furnace carbon black for use in the process of the present invention are medium grade furnace carbon blacks such as, for example, Raven 150 or Raven 1000 (Columbian Carbon Division of Cities Service Co.) and Regal 300R (Cabot Corp.).

The extrudate upon exiting from the extruder is cooled by any convenient means and cut by any suitable means to provide granules of the tinting concentrate.

The method described hereinabove provides a tinting concentrate having furnace carbon black well dispersed therein. A hot-pressed film of the tinting concentrate exhibits high clarity and low haze.

The tinting concentrate of furnace carbon black described hereinabove is added to and mixed with an acrylate monomer (e.g., methyl methacrylate or an acrylate sirup or a mixture thereof) utilizing any suitable mixing means to provide a dispersion suitable for casting into sheet form directly. Alternatively, a masterbatch or intermediate dispersion of the tinting concentrate and the acrylate monomer may be first prepared and later let down (i.e., diluted) with additional acrylate monomer or sirup to provide a dispersion suitable for casting into sheet form. A salient feature of the present invention is that the casting dispersion or intermediate dispersion must contain nitrocellulose. Specifically, it is essential that the dispersion contain at least 0.01% by weight, based upon the total weight of the dispersion, of nitrocellulose. In practice, the intermediate dispersion is prepared by dissolving the nitrocellulose in the acrylate monomer in a suitable resin kettle utilizing a low-shear impeller mixer and thereafter adding the tinting concentrate of furnace carbon black to the mixture accompanied by stirring for a suitable time, e.g., 1 hour, to dissolve and disperse the tinting concentrate in the mixture.

The resulting intermediate dispersion prepared as described above is preferably let down by adding acrylate monomer thereto and a suitable catalyst to provide a casting dispersion. The casting dispersion is preferably de-gassed in a known manner, e.g., in a vacuum of about 20 inches of mercury, and cast on a suitable substrate such as, for example, the bottom plate of a standard cell which is then closed by adding the top plate to provide a cell of two separated plates, e.g., glass, and cast acrylate dispersion therebetween. The cell is next preferably heated in a water bath at, for example, 84°C. for a suitable time, e.g., 30 minutes, followed by heating at about 130°C. in an oven or with infra-red heaters for about 5 minutes. Thereafter, the cell is cooled in any suitable manner, e.g., with water, and the cast acrylate sheet is then removed from the cell.

The acrylate monomer and acrylate sirup and the polymerization catalyst, often referred to as polymerization initiators, mentioned hereinabove are described in U.S. Pat. No. 3,474,081. A preferred acrylate for the concentrate of the invention is one of methyl methacrylate or a copolymer of ethyl acrylate and methyl methacrylate such as a copolymer of 13% by weight, based upon the total copolymer weight, of ethyl acrylate and 87% by weight, based upon the total copolymer weight, of methyl methacrylate; a yet other preferred copolymer is a copolymer of 4.5% by weight, based upon the total copolymer weight, of ethyl acrylate and 95.5% by weight, based upon the total copolymer weight, of methyl methacrylate.

The principle and practice of the present invention will now be illustrated by the following Examples which are exemplary only and it is not intended that the invention be limited thereto since modifications in technique and operation will be apparent to anyone skilled in the art. All parts and percentages specified herein are by weight unless otherwise specified.

The visible light transmission and haze properties of the tinted acrylate sheet samples of the Examples herebelow were evaluated in accordance with the testing procedure described in ASTM-D1003 — Procedure B.

EXAMPLE 1

0.7% dry Raven 150 furnace carbon black was tumble blended with bead acrylic resin consisting of 87% methyl methacrylate and 13% ethyl acrylate in a drum tumbler. The blend of furnace carbon black and acrylate polymer resin was fed into a ZSK-53 melt extruder (Werner-Pfleiderer) and extruded under normal operating conditions for acrylate resins with a temperature profile through the extruder ranging from ambient temperature at the feed zone to 240°C. at the extrusion die with intermediate zone temperatures of 150°C. for the first zone after the feeding zone and 230°C. for the other intermediate zones. The molten extrudate was cooled and cut according to standard practice to provide a furnace carbon black concentrate.

A film of the concentrate melt pressed betweeen Teflon sheets exhibited characteristic bronze tint and was clear and visually free of haze.

An intermediate dispersion was prepared by dissolving at ambient temperature (20°–30°C.) 0.29 gram of one-half second regular soluble grade nitrocellulose and 40 grams of methyl methacrylate and 40 grams of methyl methacrylate sirup having a viscosity of 1,200 centipoises in a 500 ml. resin kettle using a low-shear impeller mixer. Six grams of the above concentrate were added to the intermediate dispersion and stirred for about 1 hour to complete dissolution of the concentrate in the intermediate dispersion.

A final casting sirup was prepared by mixing 10 grams of the above intermediate dispersion, 85 grams of methyl methacrylate sirup having a viscosity of 1,200 centipoises and 5 grams of a catalyst solution consisting of 1.5 grams of 2,2'-azobis(2,4 dimethyl valeronitrile) in 150 grams of methyl methacrylate in a 250 ml. vacuum flask having a magnetic stirring bar while simultaneously de-gassing the dispersion in a vacuum of about 20 inches of mercury for about 20 minutes. The de-gassed mixture was cast in a standard cell of two separated glass plates. The cell was next immersed in a water bath at 84°C. for about 30 minutes, followed by heating with infra-red to about 130°C. for about 5 minutes. The cell was next immediately quenched in cold tap water and after about 20 seconds the acrylate sheet separated from the glass plates of the cell. The acrylate sheet was removed from the cell and when measured was found to have a thickness of 50 mils, a total visible light transmission of 49.9% and a haze of 2.2%.

For comparison, a clear, untinted control sheet of the same acrylate resin, but without carbon black concentrate, and of a thickness of 50 mils exhibited a haze of 1.7%.

The foregoing indicates that the tinted acrylate sheet of the invention has excellent haze characteristics.

EXAMPLE 2

The procedure of Example 1 was repeated to prepare a tinted acrylate sheet except that the final casting sirup contained 5 grams of the intermediate dispersion, 90 grams of methyl methacrylate sirup having a viscosity of 1,200 centipoises and 5 grams of the same catalyst solution.

The resulting cast acrylate sheet having a thickness of 105 mils had a total visible light transmission of 48.9% and a haze of 3.7%.

Another sample of the same acrylate cast sheet having a thickness of 196 mils had a total visible light transmission of 34.1% and a haze of 3.5%.

EXAMPLE 3

0.3% dry Raven 150 furnace carbon black was tumble blended with bead acrylate resin consisting of 77% methyl methacrylate and 13% ethyl acrylate in a drum tumbler. The blend of a furnace carbon black and acrylate polymer resin was fed into a ZSK-53 melt extruder (Werner-Pfleiderer) and extruded under normal operating conditions for acrylate resins with a temperature profile through the extruder ranging from ambient temperature at the feed zone to 240°C. at the extrusion die with intermediate zone temperatures of 150°C. for the first zone after the feeding zone and 230°C. for the other intermediate zones. The molten extrudate was cooled and cut according to standard practice to provide a furnace carbon black concentrate.

A film of the concentrate melt pressed between Teflon sheets exhibited characteristic bronze tint and was clear and visually free of haze.

An intermediate dispersion was prepared by dissolving at ambient temperature (20°-30°C.) 0.29 gram of one-half second regular soluble grade nitrocellulose and 84 grams of methyl methacrylate in a 500 mil resin kettle using a low-shear impeller mixer. Twelve grams of the above concentrate was added to the intermediate dispersion and stirred for about 1 hour to complete dissolution of the concentrate in the intermediate dispersion.

A final casting sirup was prepared by mixing 10 grams of the above intermediate dispersion, 85 grams of methyl methacrylate sirup having a viscosity of 1200 centipoises and 5 grams of a catalyst solution consisting of 1.5 grams of 2,2'-azobis(2,4 dimethyl valeronitrile) in 150 grams of methyl methacrylate in a 250 ml. vacuum flask having a magnetic stirring bar while simultaneously de-gassing the dispersion in a vacuum of about 20 inches of mercury for about 20 minutes. The degassed mixture was cast in a standard cell of two separated glass plates which were next immersed in a water bath at 84°C. for about 30 minutes, followed by heating with infra-red to about 130°C. for about 5 minutes. The cell was next immediately quenched in cold tap water and after about 30 seconds the acrylate sheet separated from the glass plates of the cell. The acrylate sheet was removed from the cell and when measured was found to have a thickness of 50 mils and a haze of 3.6%.

CONTROL EXAMPLE I

Acrylate sheets of 105 mils thickness made by substantially the same procedure described in Example 1 without utilizing any nitrocellulose were cloudy and gray in appearance and had a measured haze of about 15%.

CONTROL EXAMPLE II

Acrylate sheets of 105 mils thickness were made by substantially the same procedure described in Example 3 without utilizing any nitrocellulose, but with drying of the concentrate in a vacuum oven at about 20 inches Hg and 70°C. for three days before the intermediate dispersion was prepared. Castings were cloudy and gray in appearance and had a measured haze of about 20%.

The foregoing clearly illustrates that when the tinting concentrate is dissolved in acrylate monomer or sirup, the furnace carbon black particles reagglomerate and result in hazy cast sheeting. Surprisingly and unexpectedly, the addition of a small amount of nitrocellulose to the casting dispersion in the amounts described hereinabove serves to wet or otherwise interact with the dispersed furnace carbon black particles and prevent reagglomeration of these particles, and these dispersions provide transparent and substantially haze free cast acrylate sheet.

I claim:

1. A process for preparing tinted article of acrylate polymeric material comprising
   a. mixing a dispersion of
      1. not more than 50% by weight, based upon the total weight of said dispersion, of a concentrate of not more than 20% by weight, based upon the total weight of said concentrate, of furnace carbon black and, complementally, not less than 80% by weight, based upon the total weight of said concentrate, of an acrylate polymer,
      2. not less than 50% by weight, based upon the total weight of said dispersion, of methyl methacrylate or methyl methacrylate sirup, and
      3. at least 0.01% by weight, based upon the total weight of said dispersion, of nitrocellulose;
   b. adding a polymerization catalyst to said dispersion and casting said dispersion on a substrate followed by heating said dispersion to a temperature of at least 50°C. to cure said dispersion and thereby provide said article of acrylate polymeric material.

2. The process of claim 1 wherein said concentrate is prepared by high shear melt compounding said furnace carbon black and said acrylate polymer.

3. The process of claim 2 wherein the high shear melt compounding is performed in a high shear, twin-screw melt extruder.

4. The process of claim 2 wherein said acrylate polymer is a copolymer of ethyl acrylate and methyl methacrylate.

5. The process of claim 4 wherein said copolymer comprises 13% by weight, based upon the total copolymer weight, of ethyl acrylate and 87% by weight, based upon the total copolymer weight, of methyl methacrylate.

6. The process of claim 5 wherein said furnace carbon black is present in said dispersion in an amount of 0.7% by weight, based upon the total weight of said dispertion.

7. The process of claim 6 wherein said nitrocellulose is present in said dispersion in an amount of 0.2% by weight, based upon the total weight of said dispersion.

8. The process of claim 3 wherein said copolymer comprises 4.5% by weight, based upon the total copolymer weight, of ethyl acrylate and 95.5% by weight, based upon the total copolymer weight, of methyl methacrylate.

9. Tinted acrylate sheet prepared by the process of claim 1.

10. The tinted acrylate sheet of claim 9 having a haze of less than 5%.

* * * * *